United States Patent
Shibayama et al.

[11] Patent Number: 6,058,614
[45] Date of Patent: May 9, 2000

[54] APPARATUS FOR MEASURING ALIGNMENT OF SUSPENSION AND METHOD OF INSPECTING SUSPENSION BY USING SAID APPARATUS

[75] Inventors: Takao Shibayama; Ryuichiro Furukawa, both of Saitama-ken, Japan

[73] Assignee: Honda Giken Kogyo Kabushiki Kaisha, Tokyo, Japan

[21] Appl. No.: 09/090,926

[22] Filed: Jun. 5, 1998

[30] Foreign Application Priority Data

Jun. 6, 1997 [JP] Japan .................................. 9-149175
Jun. 26, 1997 [JP] Japan .................................. 9-170125

[51] Int. Cl.[7] .......................... G01M 17/00; B62D 65/00
[52] U.S. Cl. .............................................. 33/203; 33/645
[58] Field of Search ................................ 33/203, 203.15, 33/203.16, 203.17, 600, 645

[56] References Cited

U.S. PATENT DOCUMENTS

| | | | |
|---|---|---|---|
| 3,181,248 | 5/1965 | Manlove | 33/645 |
| 3,494,045 | 2/1970 | Merrill | 33/645 |
| 3,977,067 | 8/1976 | LaValley | 33/203.18 |
| 4,157,618 | 6/1979 | Davis | 33/203.15 |
| 4,429,467 | 2/1984 | Murata et al. | 33/203 |
| 4,901,442 | 2/1990 | Fujii | 33/203.13 |
| 4,962,664 | 10/1990 | Hirano et al. | 33/203.13 |
| 5,797,190 | 8/1998 | Matson | 33/203.18 |
| 5,815,935 | 10/1998 | Fukuda et al. | 33/203.15 |
| 5,842,281 | 12/1998 | Mieling | 33/203.18 |

FOREIGN PATENT DOCUMENTS

| | | |
|---|---|---|
| 3-61888 | 9/1991 | Japan . |
| 6-129950 | 5/1994 | Japan ........................................ 33/645 |
| 858 274 | 1/1961 | United Kingdom . |
| 1 280 791 | 1/1970 | United Kingdom . |

*Primary Examiner*—Randy W. Gibson
*Attorney, Agent, or Firm*—Armstrong, Westerman, Hattori, McLeland & Naughton

[57] ABSTRACT

A supporting frame supports a measuring head which has mounted thereon a measuring element which abuts with a reference surface of a wheel mounting member so as to be inclinable about a camber axis and a toe axis. A plurality of holding arms which can be opened and closed are provided on this supporting frame. Each of the holding arms is provided with a roller. The wheel mounting member is held by these rollers in a diametrically aligned condition. Each of these rollers is made of an elastic member and is rotatably supported by fitting onto a roller axis which is parallel with a tangential line of the wheel mounting member at a point of abutment of each of the rollers with the wheel mounting member. The wheel mounting member is thus made free to incline. A suspension is moved up and down by vertically driving the supporting frame. The toe change characteristics and the camber change characteristics as a result of this vertical movement are compared with reference change characteristics to thereby discriminate the assembling accuracy of the suspension.

11 Claims, 13 Drawing Sheets

APPARATUS FOR MEASURING ALIGNMENT OF SUSPENSION AND METHOD OF INSPECTING SUSPENSION BY USING SAID APPARATUS

BACKGROUND OF THE INVENTION

1. Field of the Invention

The present invention relates to an apparatus for measuring alignment which is mainly applicable to a rear suspension of a motor vehicle, and relates to a method of inspecting a suspension by using this apparatus for measuring alignment.

2. Description of the Related Art

As this kind of apparatus for measuring alignment, there has hitherto been known one in Japanese Published Examined Patent Application No. 61888/1991. Namely, the apparatus for measuring alignment comprises: jig means for supporting a suspension sub-assembly, which is made up by assembling a suspension on a sub-frame, in a predetermined position; a supporting frame which is disposed on a side of the jig means; a measuring element which can perpendicularly abut with (or contact) a reference surface which crosses at right angles an axle of a wheel mounting member to be rotatably supported by a knuckle of the suspension; a holding means which can hold the wheel mounting member in a condition to diametrically align the wheel mounting member; a measuring head for supporting the measuring element so as to be inclinable about a longitudinal camber axis and about a vertical toe axis, the measuring head having camber detecting means and toe detecting means, the camber detecting means being for detecting an angle of inclination of the measuring element about the camber axis, the toe detecting means being for detecting an angle of inclination of the measuring element about the toe axis. The measuring head is supported by a pushing means so as to be pushed (or urged) laterally inward so that the measuring element can come into abutment with the reference surface of the wheel mounting member.

In this conventional apparatus, the holding means is constituted by a plurality of holding pieces which are mounted on the measuring element so as to be opened and closed. The measuring head is pushed laterally inward to thereby bring the measuring element into abutment with the reference surface of the wheel mounting member, and also the holding pieces are closed to thereby hold the circumferential (or peripheral) surface of the wheel mounting member. According to this arrangement, the measuring element becomes capable of inclining about an axis of camber depending on the change in camber by means of the member for adjusting the alignment of the suspension. It thus becomes possible to adjust the alignment while measuring the camber.

In the above apparatus as described in the Japanese Published Examined Patent Application No. 61888/1991, the toe is not measured. However, by supporting the measuring element so as to be inclined about the vertical toe axis and by mounting, on the measuring head, a detecting means which measures the angle of inclination about the toe axis, the toe can also be measured.

When the wheel mounting member is held by the holding means, the camber and the toe are not fixed because the alignment has not been made yet. As a result, in some cases, the wheel mounting member is held while the axis of the wheel mounting member, i.e., the wheel axle is inclined, relative to the holding center of the holding means. If the holding means is mounted on the measuring element as in the above-described conventional apparatus, the center line of the measuring element becomes the center of holding. Therefore, if the wheel mounting member is held in a state in which the wheel axle is inclined relative to the holding center, the measuring element will no longer abut at right angles with the reference surface of the wheel mounting member. The camber and the toe therefore can no longer be accurately measured.

In view of the above-described points, the present invention has a first object of providing an apparatus for measuring alignment which can surely abut the measuring element with the reference surface of the wheel mounting member so that the camber and the toe can be accurately measured.

Further, generally speaking, the suspension has the following arrangement. Namely, a predetermined one arm out of a plurality of arms is connected, via an adjustment member such as an eccentric cam, or the like, to the sub-frame such that the position thereof can be adjusted. The alignment can thus be adjusted by the adjusting member. After the alignment has been adjusted at the stage of sub-assembling of the suspension, the suspension is mounted on the vehicle body.

Recently, a multi-link type of suspension comes to be used as the rear suspension of the motor vehicle. The multi-link type of suspension is made by constituting an upper arm and a lower arm of a double wishbone type respectively by a plurality of links. The alignment is made adjustable by adjusting the position of connection of a predetermined one link relative to the sub-frame.

Even if the suspension constituting members which are connected to the sub-frame in an unadjustable manner are deviated in its connecting position from the reference position, the alignment can be adjusted by the adjustment of the connecting position of that suspension constituting member relative to the sub-frame which is connected to the sub-frame via the adjustment member, thereby obtaining the required toe and camber.

However, in order to make the suspension in a high quality, it is necessary to remove the assembly error of the suspension such as the deviation in the connecting position of the suspension constituting members relative to the sub-frame. In this case, it may be possible to control the assembly accuracy by measuring the position of each of the connecting positions. This is however time-consuming.

In view of the above points, the present invention has a second object of providing a method of inspecting a suspension in which the assembly accuracy of the suspension can be easily discriminated.

SUMMARY OF THE INVENTION

In order to attain the above-described first object, the present invention is an apparatus for measuring alignment of a suspension of a vehicle, the measuring being made at a stage of sub-assembling of the suspension, the apparatus comprising: jig means for supporting a suspension sub-assembly in a predetermined position; a supporting frame disposed on each lateral side of the jig means; a measuring element which perpendicularly abuts with a reference surface which is at right angles to an axle of a wheel mounting member, the wheel mounting member being rotatably supported by a knuckle of the suspension; holding means for holding the wheel mounting member in a condition to diametrically align the wheel mounting member; a measuring head for supporting the measuring element so as to be inclinable about a longitudinal camber axis and about a vertical toe axis, the measuring head having camber detecting means and toe detecting means, the camber detecting means being for detecting an angle of inclination of the measuring element about the camber axis, the toe detecting means being for detecting an angle of inclination of the measuring element about the toe axis; the measuring head being supported on the supporting frame in a manner to be pushed laterally inward via pushing means such that the measuring element abuts with the reference surface of the wheel mounting member: wherein a plurality of holding arms which constitute the holding means are supported on the supporting frame so as to be opened and closed in a diametrical direction of the wheel mounting member; and wherein an elastic roller which is made up of an elastic member to abut with a circumferential surface of the wheel mounting member is supported on each of the holding arms, the roller being rotatable about a roller axis which is parallel with a tangential line of the wheel mounting member at a point of abutment with each of the rollers.

According to the apparatus of the present invention, there is no possibility that the inclination of the measuring element is restricted by the holding means. Therefore, by the laterally inward pushing of the measuring head, the measuring element can surely be abutted at right angles with the reference surface of the wheel mounting member. As a consequence, the camber and the toe can be accurately measured by each of the detecting means.

On the other hand, according to the apparatus of the present invention, since the holding means do not incline about the camber axis and the toe axis, there is a possibility that the inclination in the camber direction and the toe direction of the wheel mounting member in the alignment adjustment is restricted. However, according to the present invention, since each of the holding arms which serve as the holding means abuts with the circumferential surface of the wheel mounting member via the elastic roller, the inclination of the wheel mounting member is allowed due to the elastic deformation and rotation of the elastic roller. Therefore, there is no obstacle to the alignment adjustment. In this case, if each of the elastic rollers is supported on each of the holding arms so as to be slidable in the axial direction of the roller axis, the freedom of the wheel mounting member increases.

In order to align the wheel mounting member, at least three portions on the circumference of the wheel mounting member must be held. In this case, three holding arms may be provided. This will, however, result in a complicated structure. On the other hand, if a pair of upper and lower holding arms are provided, and two elastic rollers are rotatable supported on one of the holding arms so as to abut with the circumferential surface of the wheel mounting member on both circumferential sides of a vertical diametrical line of the wheel mounting member, and one elastic roller is rotatably supported on the other of the holding arms so as to abut with the circumferential surface of the wheel mounting member at the diametrical line, the wheel mounting member can be held by two holding arms without impairing the ease with which the alignment of the wheel mounting member can be made. In this case, there will be needed a synchronous mechanism which synchronously opens and closes both the holding arms. This synchronous mechanism can be easily constituted by a first rack which is connected to the upper holding arm so as to extend downward, a second rack which is connected to the lower holding arm so as to extend upward, and a pinion which is engaged with the first and second racks and is rotatably supported by the supporting frame.

Further, if the supporting frame is vertically driven and the apparatus further comprises displacement detecting means for detecting a vertical displacement of the supporting frame, the changes in the camber and the toe as a result of the vertical movement of the suspension can be measured. Still furthermore, if a means for pushing the supporting frame in the back and forth direction is provided, the changes in the camber and the toe at the time when a force in the back and forth direction is applied can also be measured.

In order to attain the above-described second object, there is provided a method of inspecting a suspension by using the above-described apparatus for measuring alignment of a suspension of a vehicle. The method comprises: adjusting alignment such that a toe and a camber of the wheel mounting member become predetermined values respectively; vertically moving the suspension by vertically driving the supporting frame; obtaining toe change characteristics and camber change characteristics of the wheel mounting member due to vertical movement of the suspension, based on changes in a detected value of the displacement detecting means and in a detected value of the toe detecting means and a detected value of the camber detecting means during the vertical movement; and comparing the toe change characteristics and the camber change characteristics with reference change characteristics to thereby judge an assembly accuracy of the suspension.

If there is an assembly error such as a deviation in the connecting position of the suspension constituting members relative to the sub-frame, the following may occur even if an alignment is made to make the toe and the camber to predetermined values in a static state. Namely, the toe change characteristics may deviate from the reference change characteristics as a result of the vertical movement of the suspension, or the camber change characteristics may deviate from the reference change characteristics. Therefore, by comparing the toe change characteristics and the camber change characteristics with the reference change characteristics, the presence or absence of the assembly error can be accurately discriminated.

Further, depending on the kind of the suspension constituting members, those patterns of the toe change characteristics and the camber change characteristics which appear when the connecting position relative to the sub-frame deviates. Therefore, by making the following arrangement, the countermeasures can be taken easily. The arrangement in question is checking in advance as to in what pattern the toe change characteristics and the camber change characteristics deviate relative to the reference change characteristics when a connecting position of each of a plurality of constituting members of the suspension deviates relative to a sub-frame, and discriminating a cause for an assembly error in the suspension by comparing the pattern of deviation of measured toe characteristics and measured camber change characteristics relative to the reference change characteristics with the pattern which is checked in advance.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 13:
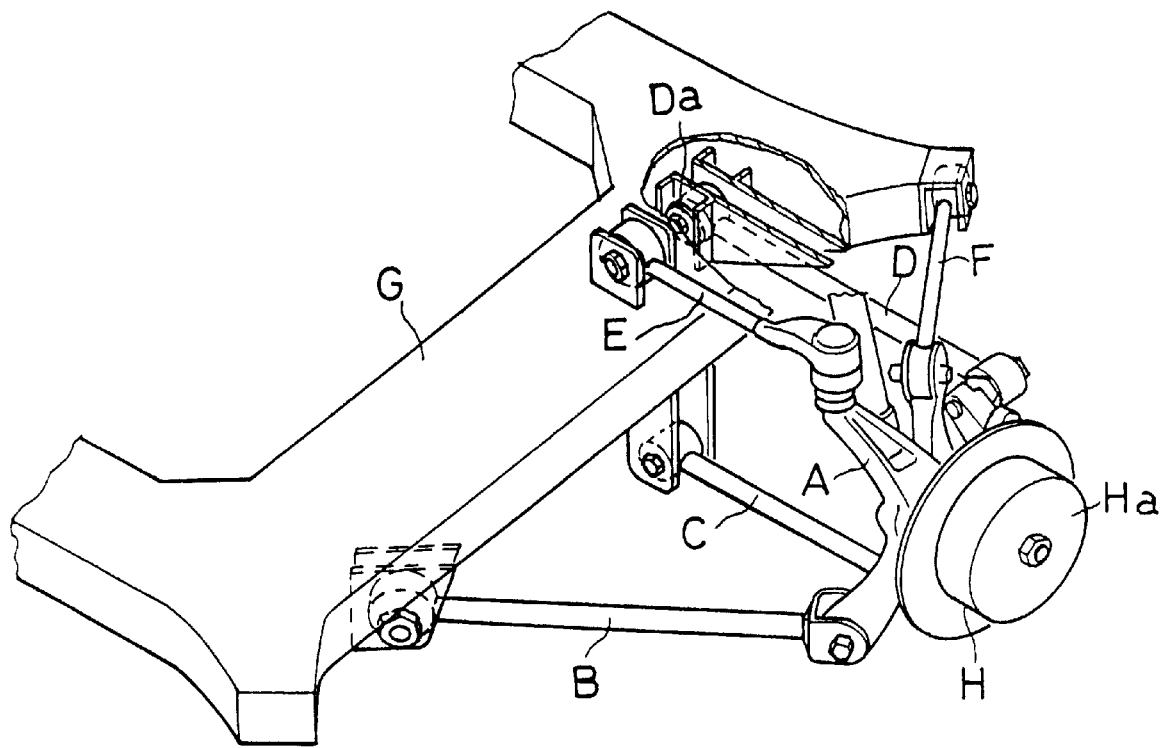
FIG. 13 is a perspective view of a suspension.

An explanation is now made about an embodiment in which the present invention is applied to an apparatus for measuring alignment of a multi-link type of suspension which is used as a rear suspension of a motor vehicle as shown in FIG. 13.

The multi-link type of suspension is a suspension which is made by constituting a lower arm to be connected to a lower portion of a knuckle A and an upper arm to be connected to an upper portion thereof by a plurality of links. In the embodiment shown in FIG. 13, the lower arm is constituted by a trailing link B which is connected to a lower front end of the knuckle A and extends obliquely forward, a lower link C which is connected to a lower intermediate portion of the knuckle A and extends laterally, and a control link D which is connected to a lower rear end of the knuckle A and extends laterally. The upper arm is constituted by an upper link E which is connected to an upper portion of the knuckle A and extends laterally, and a leading link F which is connected to an upper portion of the knuckle A and extends obliquely backward. Each of these links is connected to a sub-frame G to thereby assemble a suspension sub-assembly. That connecting position of the control link D which is connected to the sub-frame G is laterally adjustable by means of an alignment adjusting member which is made of an eccentric cam Da. The connecting position of the control link D is adjusted such that the toe and the camber to be measured by the apparatus for measuring alignment becomes predetermined values. In the figure, reference numeral H denotes a wheel mounting member (i.e., a member for mounting a wheel thereon) which is made up of a brake disk to be rotatably supported by the knuckle A.

Figure 1:
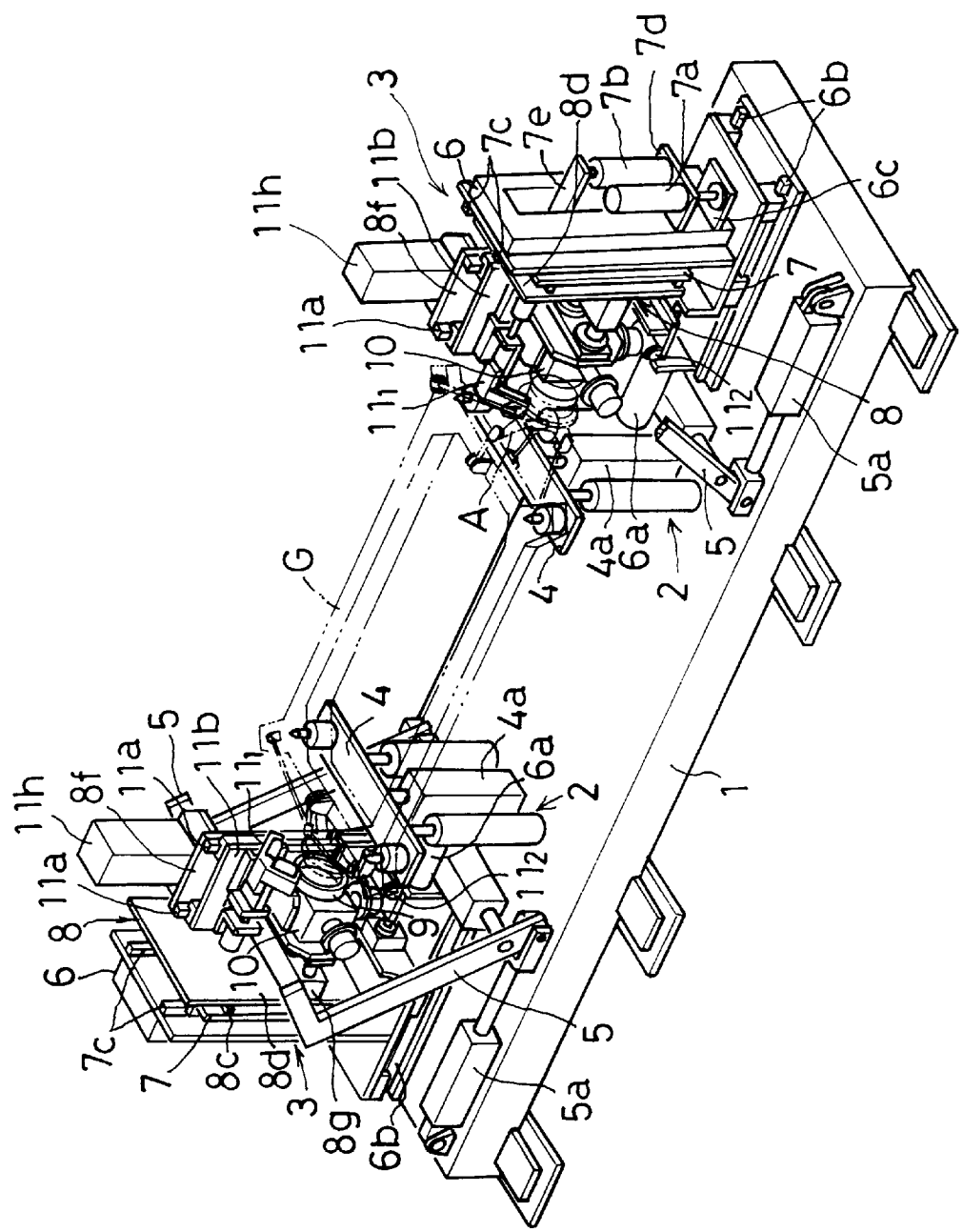
FIG. 1 is a perspective view of one example of the apparatus for measuring alignment according to the present invention.

The apparatus for measuring alignment is provided, as shown in FIG. 1, with a jig means 2 which is disposed on a bed 1, and measuring means 3, 3 which are disposed on both sides of the jig means 2.

The jig means 2 is to support the suspension sub-assembly in a predetermined position, and is constituted by the following members: i.e., a pair of right and left vertically movable workpiece receiving members 4, 4 which support, at right and left side portions of the sub-frame G, the suspension sub-assembly to be transported by a conveyor (not illustrated) disposed so as to cross the bed 1; and a pair of front and rear clamp arms 5, 5 which are provided to correspond to each of the workpiece receiving members 4 and which can be raised (or erected) and laid down. Each of the workpiece receiving members 4 is moved up and down by a cylinder 4a. The clamp arm 5 is raised and laid down by a cylinder 5a. When the suspension sub-assembly has been transported, first, the clamp arm 5 is raised and the workpiece receiving member 4 is moved up to thereby lift the sub-frame G. The sub-frame G is supported in a predetermined position in a state of being pinched by the workpiece receiving member 4 and the clamp arms 5, 5.

The measuring means 3 is provided, as shown in FIGS. 2 through 5, with: a supporting column 6 which is movable along rails 6b on a bed 1 between a laterally outer clearing position and a laterally inner measuring position; an elevating frame 7 which is moved up and down by two cylinders 7a, 7b along rails 7c which are fixed to the supporting column 6; and a supporting frame 8 which is pushed (or urged) by a pair of cylinders 8a, 8b in the back and forth direction along rails 8c which are fixed to the elevating frame 7. The supporting frame 8 is provided with a laterally-looking side plate portion 8d and a forward-looking side plate portion 8f which is connected to the side plate portion 8d via a beam 8e. A measuring head 10, which supports a cup-shaped measuring element 9 which faces a reference surface Ha perpendicular to the axle of the wheel mounting member H, is supported on a guide block 8g which is mounted on the side plate potion 8d in a laterally movable manner. A pair of upper and lower holding arms $11_1$, $11_2$, which serve as holding means for holding the wheel mounting member H from vertical sides, are supported by the side plate portion 8f so as to be vertically opened and closed.

The above-described two cylinders 7a, 7b for the elevating frame 7 are mounted on a common connecting plate 7d in a posture in which one of them looks down and the other thereof looks up. A piston rod which extends downward from the down-looking cylinder 7a is connected to a reaction force receiving member 6c which is mounted on the column 6 and which can vertically adjust its position. A piston rod which extends upward from the upward-looking cylinder 7b is connected to an arm 7e which is fixed to the elevating frame 7 and which projects through a vertically elongated slot 6d formed in the supporting column 6. From a neutral position as illustrated, the elevating frame 7 is moved down by a contracting operation of the cylinder 7a and is moved up by an extension operation of the cylinder 7b. When the elevating frame 7 moves up and down, the wheel mounting member H is moved up and down via the supporting frame 8 and the holding arms $11_1$, $11_2$. The upward vamping motion and the downward rebounding motion of the suspension relative to the vehicle body can thus be simulated.

The arm 7e is provided with a reflecting plate 12a. The supporting column 6 is provided with an ultrasonic or optical distance sensor 12 which measures the distance to the reflecting plate 12a. There is thus constituted, by the distance sensor 12, a displacement measuring means which detects the vertical displacement of the elevating frame 7, i.e., the supporting frame 8.

The above-described pair of cylinders 8a, 8b for the supporting frame 8 are mounted on the upper end of the supporting frame 8 in a posture in which one of them looks forward and the other thereof looks backward. The piston rod of each of the cylinders 8a, 8b is abutted with each of reaction force receiving members 7f which are mounted in a front and rear pair on an upper end of the elevating frame 7. By the extending movement of the forward-looking cylinder 8a, the supporting frame 8 is pushed backward. By the extension movement of the backward-looking cylinder 8b, the supporting frame 8 is pushed forward. It is thus so arranged that there can be simulated a condition in which the forward and backward force at the time of braking, or the like, operates on the suspension.

Figure 6:
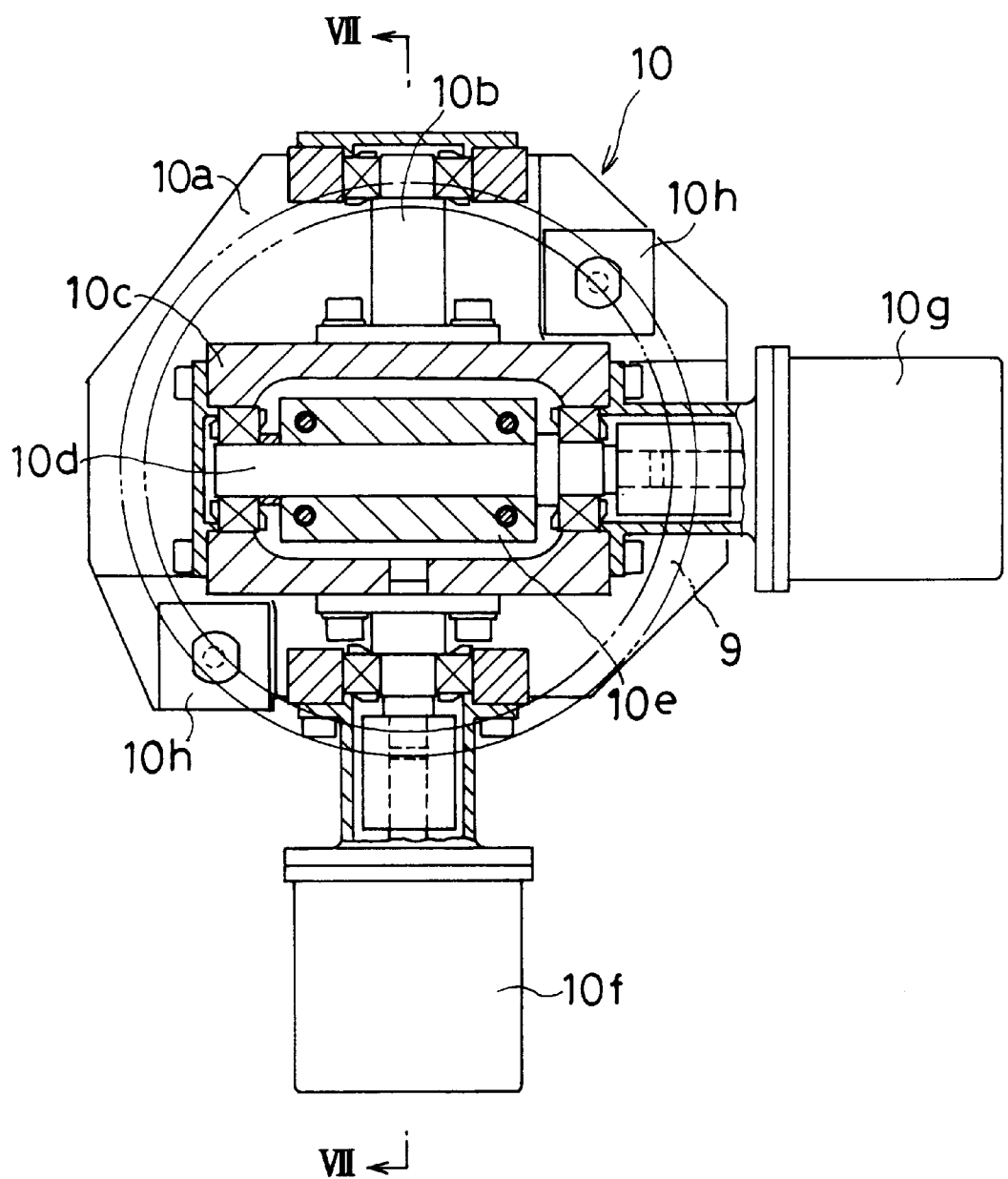
FIG. 6 is an enlarged sectional view of a measuring head taken along the line VI—VI in FIG. 2.
Figure 7:
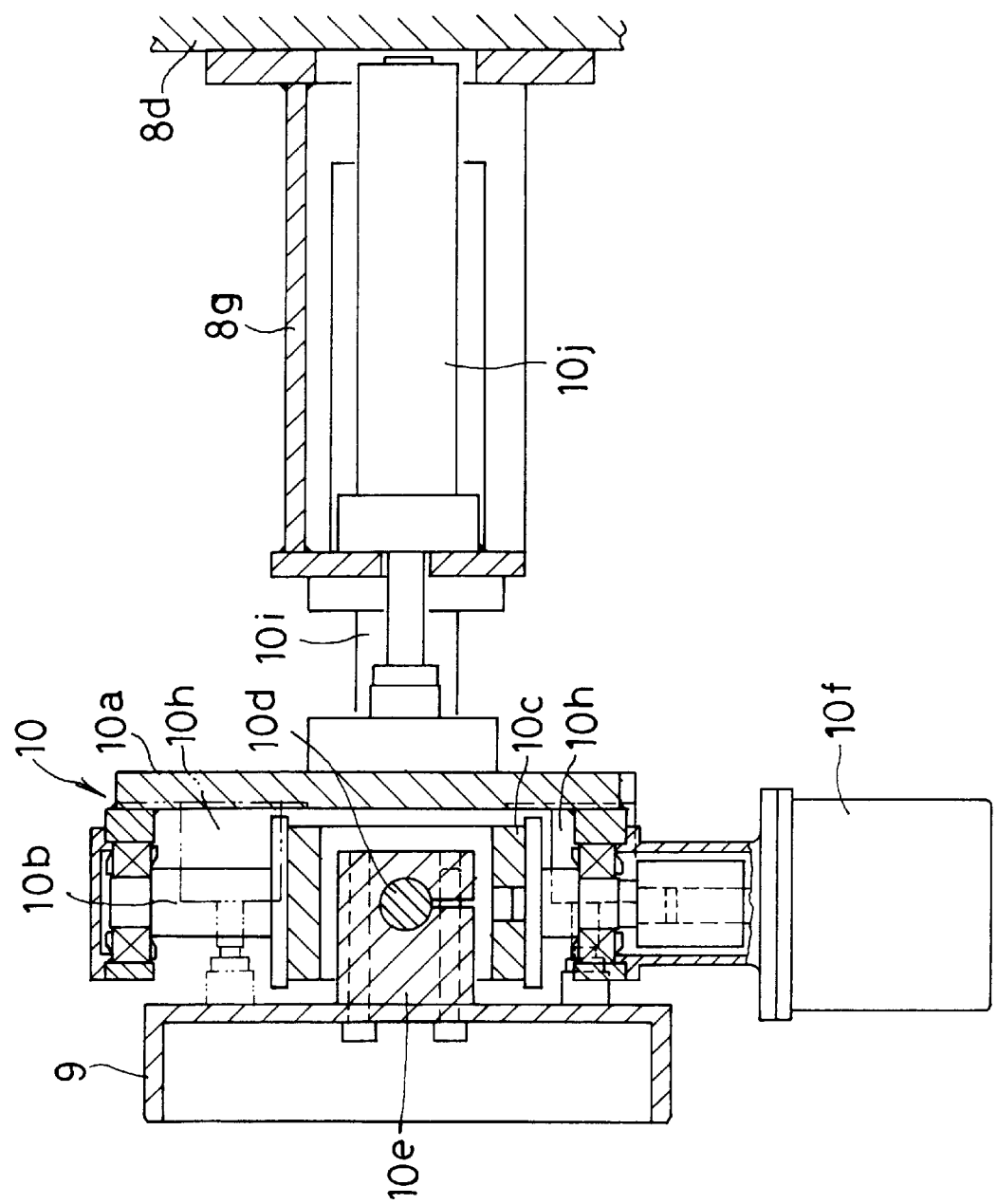
FIG. 7 is a cross-sectional view taken along the line VII—VII in FIG. 6.

The measuring head 10 is constituted, as shown in FIGS. 6 and 7, by a Hooke's universal joint comprising: a head frame 10a; a first yoke 10c which is rotatably supported by the head frame 10a so as to be rotatable about a vertical toe axis 10b; and a second yoke 10e which is rotatable about a longitudinal camber axis 10d which is rotatably supported by the first yoke 10c. The measuring element 9 is mounted on the second yoke 10e so that the measuring element 9 can be inclined about the toe axis 10b and the camber axis 10d. A toe detecting means 10f which is made up of a rotary encoder to be connected to the lower end of the toe axis 10b is mounted on the head frame 10a. A camber detecting means 10g which is made up of a rotary encoder to be connected to the front end of the camber axis 10d is mounted on the first yoke 10c. The inclination angles of the measuring element 9 about the toe axis 10b and the camber axis 10 d are measured by these measuring means 10f, 10g. In the head frame 10a, there are mounted a pair of cylinders 10h, 10h which lie opposite to the side plate portion of the measuring element 9. It is thus so arranged that the measuring element 9 can be held in the neutral posture, in which it looks toward a Just lateral direction, by the extension and contraction of both the cylinders 10h, 10h.

The measuring head 10 is laterally slidably supported on the guide block 8g via a pair of guide bars 10i, 10i which extend from the head frame 10a laterally outward. The measuring head 10 is pushed laterally inward by a cylinder 10j which serves as a pushing means which is mounted on the guide block 8g. The measuring element 9 is thus arranged to be abutted with the reference surface Ha of the wheel mounting member H.

Figure 2:
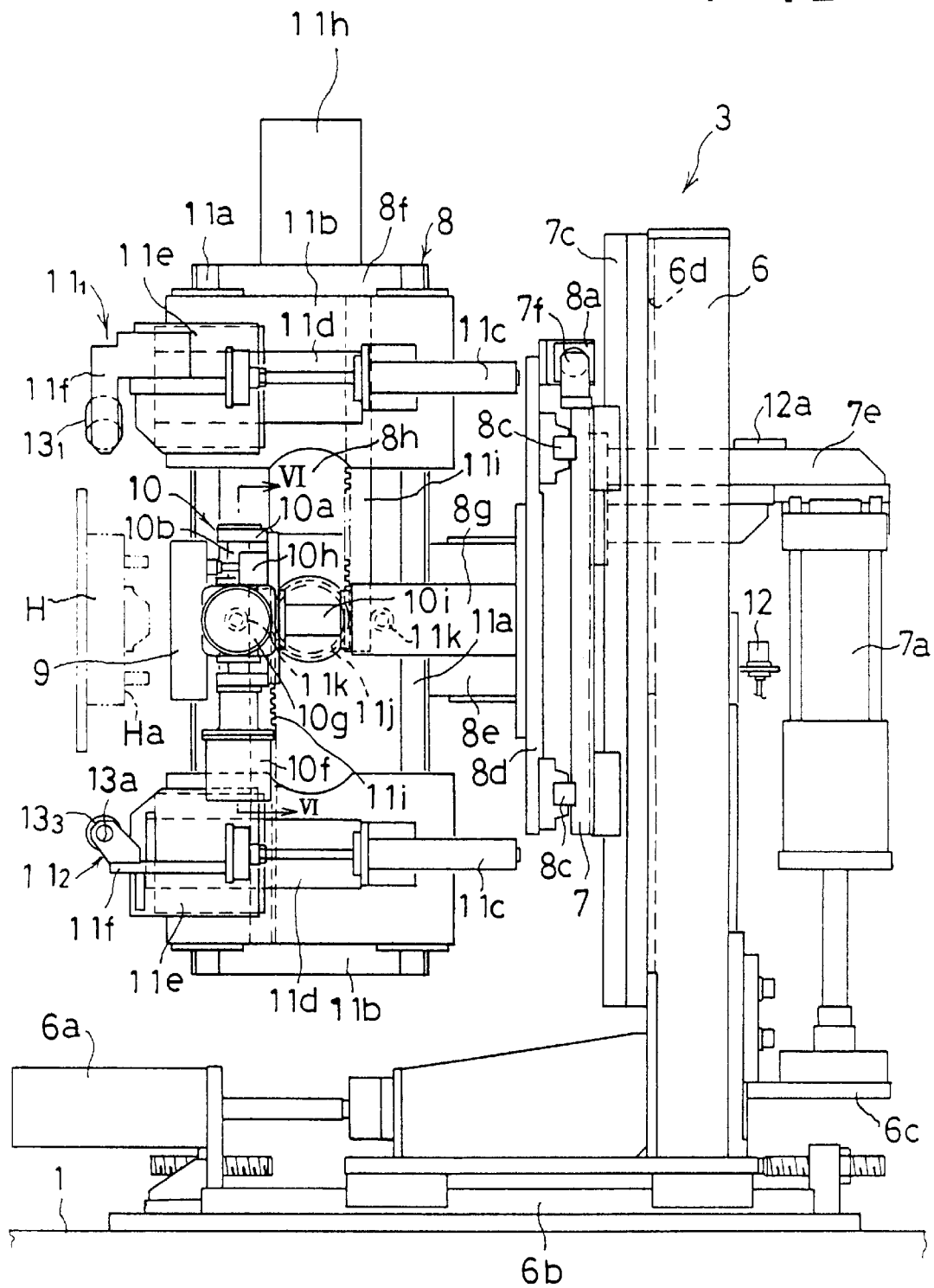
FIG. 2 is a front view of a measuring means in the apparatus in FIG. 1.
Figure 3:
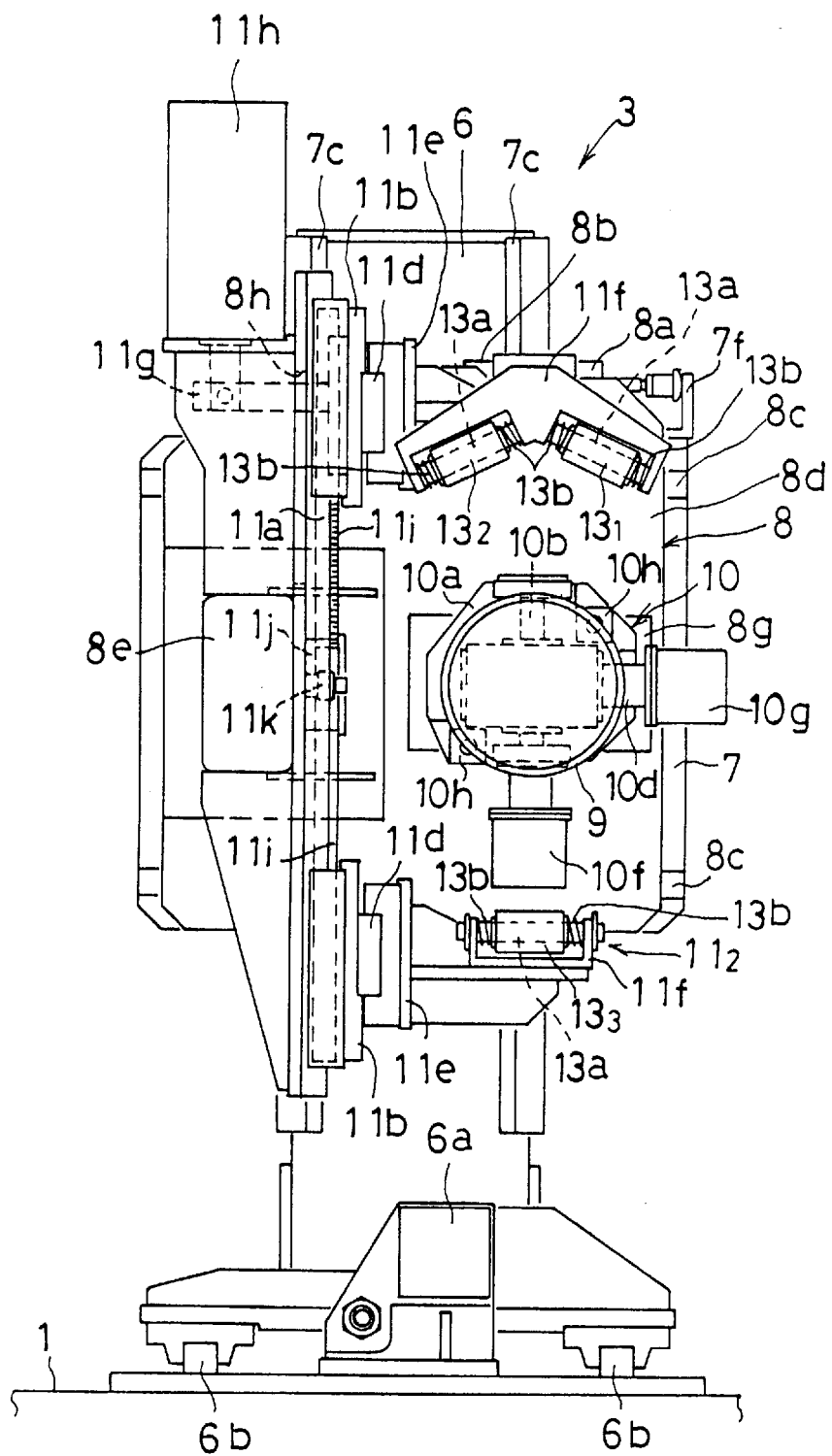
FIG. 3 is a left side view of FIG. 2.
Figure 4:
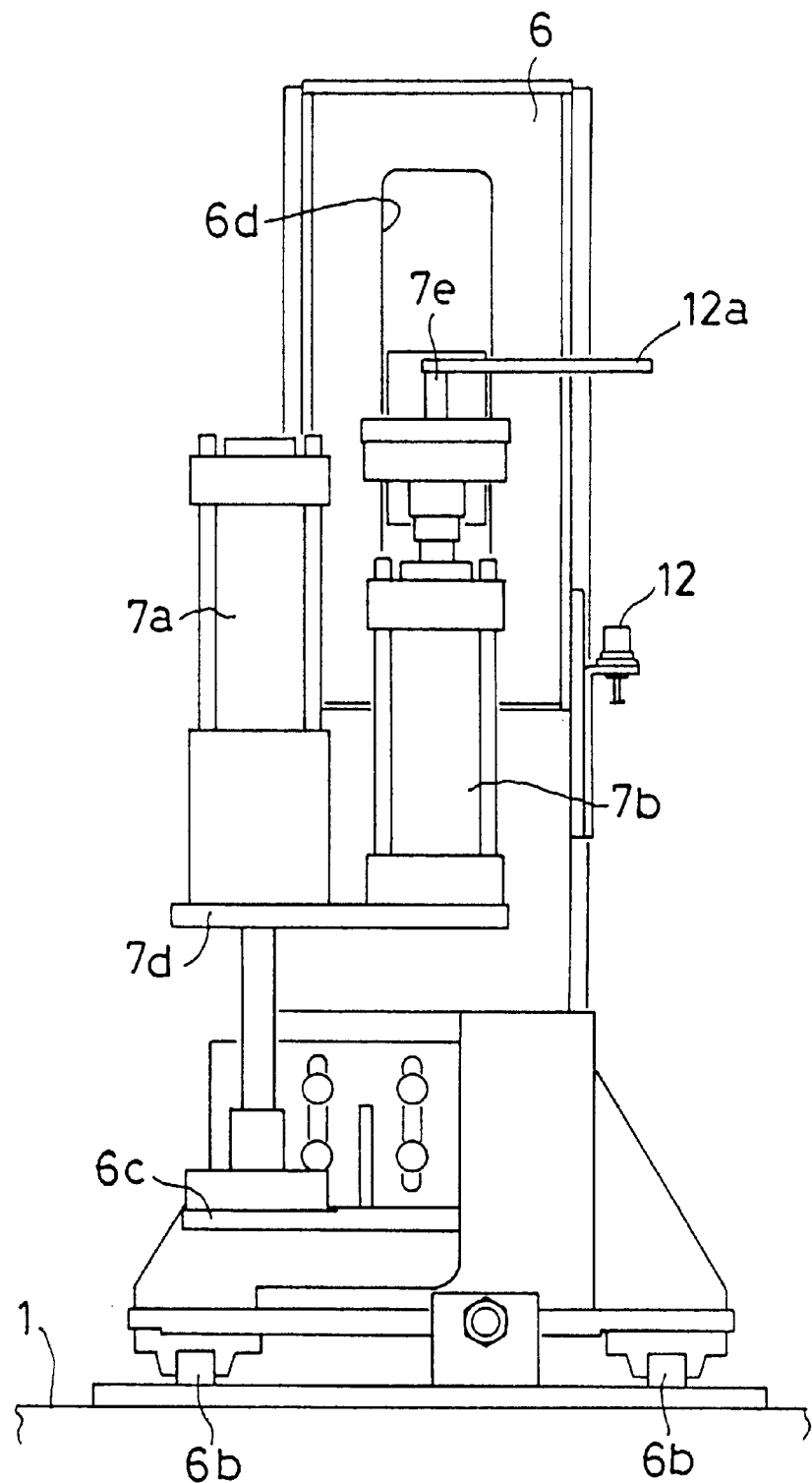
FIG. 4 is a right side view of FIG. 2.
Figure 5:
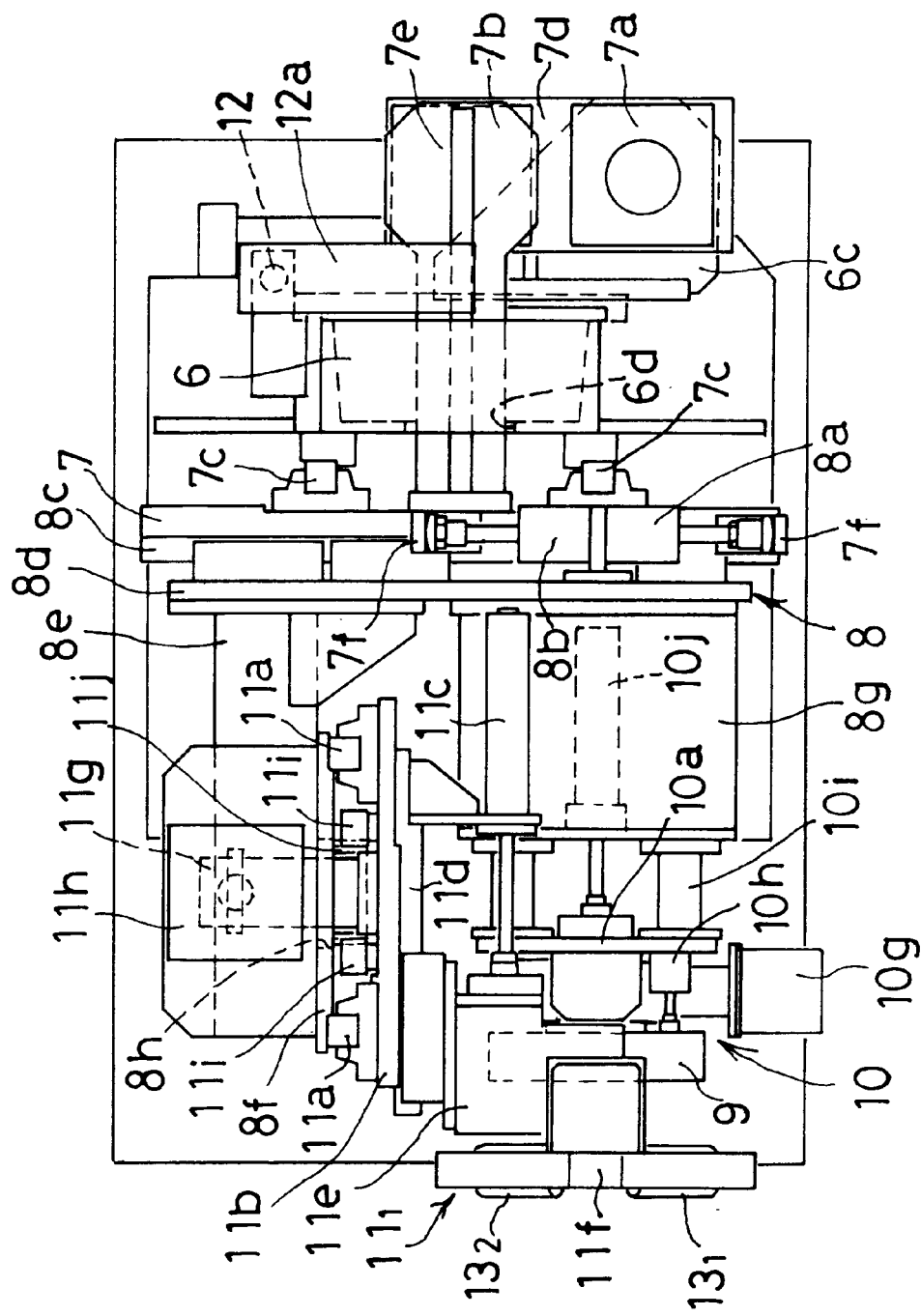
FIG. 5 is a plan view of FIG. 2.

Each of the holding arms $11_1$, $11_2$ is constituted by: a first movable frame 11b which is vertically movably supported by rails 11a fixed to the side plate portion 8f; a second movable frame 11e which is laterally movable back and forth by a cylinder 11c along a rail lid fixed to the fist movable frame 11b; and an arm main body 11f which is mounted on the second movable frame 11e. On the first movable frame 11b of the upper holding arm $11_1$, there is provided a projection 11g which projects toward the rear side of the side plate potion 8f through a vertically elongated slot 8h which is formed in the side plate portion 8f. A piston rod of a cylinder 11h which is mounted on the upper end of the rear surface of the side plate portion 8f so as to look downward is connected to the projection 11g. Further, on the first movable frames 11b, 11b of both the holding arms $11_1$, $11_2$, there are mounted racks 11i, 11i which extend upward and downward respectively. A pinion 11j which is in gearing engagement with both the racks 11i, 11i is rotatably supported by the side plate portion 8f. In this manner, both the holding arms $11_1$, $11_2$ are vertically opened and closed synchronously with each other by the operation of the cylinder 11h, with the height of disposing the pinion 11j as the center of opening and closing. In FIG. 2, reference numeral 11k denotes a back up roller for each of the racks 11i.

On the arm main body 11f of the upper holding arm $11_1$, there are provided two elastic rollers $13_1$, $13_2$ which abut with the circumferential or peripheral surface of the wheel mounting member H on circumferentially both sides of a vertical diametrical line of the wheel mounting member H. On the arm main body 11f of the lower holding arm $11_2$, there is provided an elastic roller $13_3$ which abuts with the circumferential surface of the wheel mounting member H of the diametrical line. These elastic rollers $13_1$, $13_2$, $13_3$ are slidably supported by fitting onto each of roller shafts 13a which are mounted on the respective arm main bodies 11f so as to be parallel with a tangential line of the wheel mounting member H at each of the abutment points. Each of the elastic rollers $13_1$, $13_2$, $13_3$ is elastically supported in the axially central portion of each of the roller shafts 13a by means of springs 13b, 13b disposed on axially both sides. The elastic rollers $13_1$, $13_2$, $13_3$ are made of an elastic material such as urethane rubber, or the like.

In adjusting the alignment, the suspension sub-assembly is supported in the predetermined position by the jig means 2 as described above. Then, the supporting column 6 of each of the measuring means 3 is advanced to the measuring position. In a state in which the elevating frame 7 is in the neutral position, the upper and lower holding arms $11_1$, $11_2$ are closed to thereby hold the peripheral surface of the wheel mounting member H by means of the three elastic rollers $13_1$, $13_2$, $13_3$. The wheel mounting member H is thus aligned so as to lie opposite to the measuring element 9. Here, the neutral position of the elevating frame 7 is set to such a height that the wheel mounting member H is held in a vertically neutral position (position corresponding to 1G).

Then, the second movable frame lie of each of the holding arms $11_1$, $11_2$ is pushed laterally inward by a pushing force of about 2 kgs through 3 kgs by means of the cylinder 11c. According to these operations, the wheel mounting member H is pushed laterally inward via the elastic rollers $13_1$, $13_2$, $13_3$. Plays in the connecting portions, on the side of the knuckle A and on the side of the sub-frame G, of each of the links B, C, D, E, F of the suspension are removed.

Thereafter, the measuring head 10 is moved laterally inward by the cylinder 10 to thereby abut the measuring element 9 with the reference surface Ha of the wheel mounting portion H. At this time, the measuring element 9 is initially held by the cylinder 10h in the neutral posture. After the measuring head 10 has been abutted with the reference surface Ha of the wheel mounting member H, the restriction by the cylinder 10h of inclination of the measuring element 9 is released. According to these operations, the measuring element 9 is inclined to follow the reference surface Ha and abuts with the reference surface Ha at right angles.

Then, by means of the alignment adjustment member Da which adjusts the connecting position of the control link of the suspension relative to the sub-frame G, alignment is performed so that the toe to be detected by the toe detecting means 10f and the camber to be detected by the camber detecting means 10g respectively become predetermined target values.

The target values of the toe and the camber at the time when the wheel mounting member H is in the vertically neural position are respectively zero. If the alignment adjustment member Da is relaxed, when the measuring element 9 is abutted with the reference surface Ha of the wheel mounting member H in a state in which the measuring element 9 is restricted by the cylinder 10*h* to the neutral posture, the wheel mounting member H is corrected so that the toe and the camber respectively become zero. Therefore, alignment adjustment can also be made by tightening the alignment adjustment member D*a* without releasing the restriction of inclination of the measuring element 9.

Thereafter, the elevating frame 7 is moved up and down by the cylinders 7*a*, 7*b* from the neutral position. Data from the distance sensor 12 and the data from the toe detecting means 10*f* and the camber detecting means 10*g* are sampled. The changes in the toe and the camber by the vertical displacement of the wheel mounting member H are measured. Further, the supporting frame 8 is pushed back and forth by the cylinders 8*a*, 8*b* to thereby measure the changes in the toe and the camber when a force in the back and forth direction is applied.

When the wheel mounting member H is inclined in the toe direction, the wheel mounting member H is rotated about the vertical axis relative to the holding arms $11_1$, $11_2$ and also displaces in the back and forth direction. The elastic rollers $13_1$, $13_2$ of the upper holding arm $11_2$ rotate as a result of the rotation about the vertical axis. The elastic roller $13_3$ of the lower holding arm $11_2$ slides along the roller axis 13*a* as a result of the displacement in the back and forth direction. The elastic rollers $13_1$, $13_2$ of the upper holding arm $11_1$ are elastically deformed while sliding along the respective roller axes 13*a*. The inclination of the wheel mounting member H in the toe direction can thus be allowed.

When the wheel mounting member H is inclined in the camber direction, the wheel mounting member H rotates about a horizontally extending longitudinal (i.e., back-and-forth) axis and also vertically displaces relative to the holding arms $11_1$, $11_2$. Each of the elastic rollers $13_1$, $13_2$, $13_3$ rotates as a result of the rotation about the horizontal axis. The elastic roller $13_3$ of the lower holding arm $11_2$ is elastically deformed as a result of the vertical displacement. The elastic rollers $13_1$, $13_2$ of the upper holding arm $11_1$ are elastically deformed while sliding along the respective roller axes 13*a*. The inclination of the wheel mounting member H in the camber direction can thus be allowed.

In this manner, the wheel mounting member H is held by the three elastic rollers $13_1$, $13_2$, $13_3$ while keeping the freedom of inclination in the toe direction and the camber direction. Therefor, the alignment adjustments and the measurements of the dynamic changes in the alignment can be made without a problem.

Figure 8:
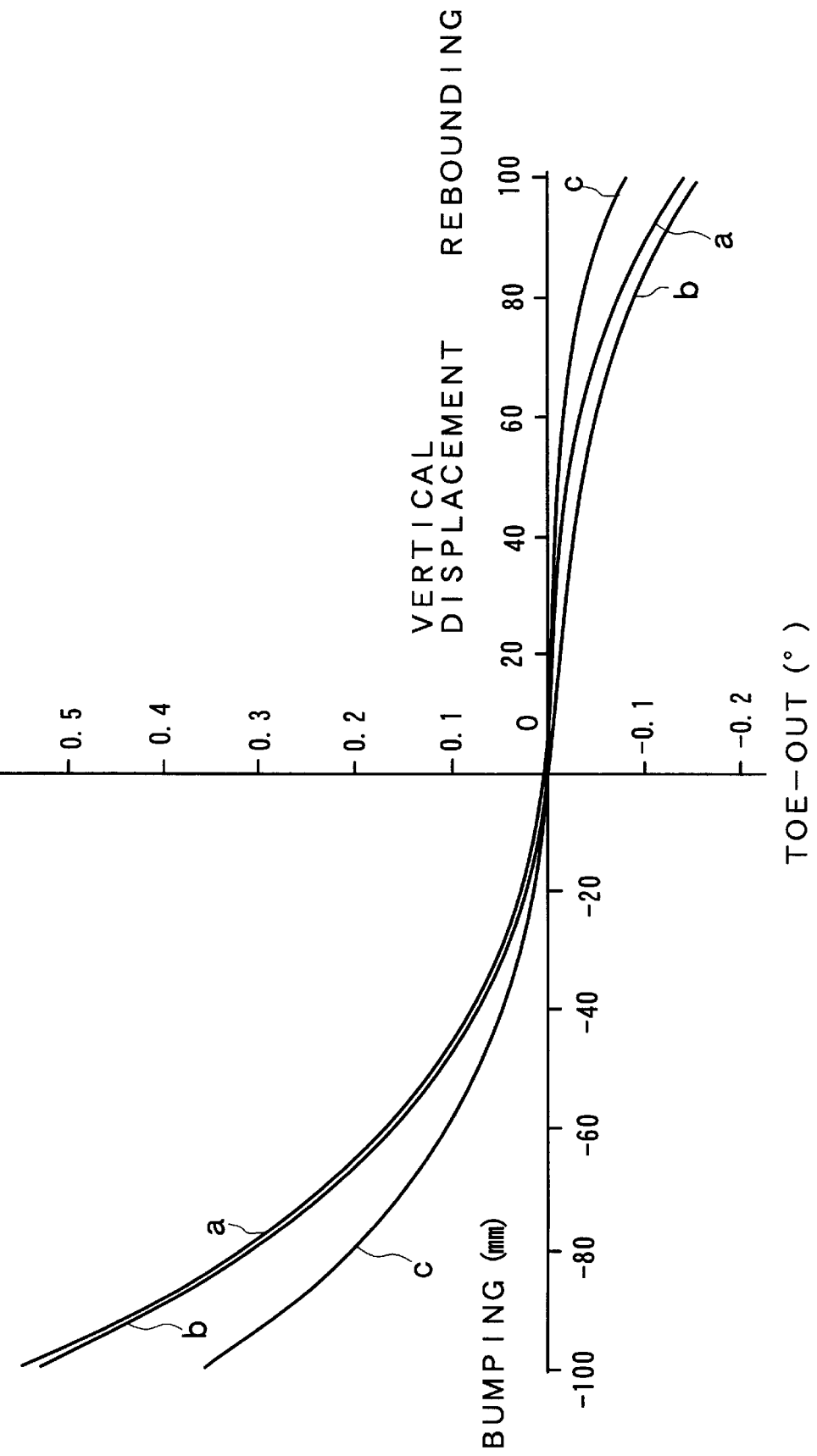
FIG. 8 is a graph showing the change in toe change characteristics by a clamping force.

However, if the closing force of the holding arms $11_1$, $11_2$ by the cylinder 11*h*, i.e., the clamping force relative to the wheel mounting member H is increased, the freedom in inclination of the wheel mounting member H is lost. The amounts of elastic deformation of the rubber bushes to be provided in the connecting portion on the side of the knuckle A of each link and the connecting portion on the side of the sub-frame G of each link become larger than those at the time when they are actually mounted on the vehicle. As a result, the alignment can no longer be measured correctly. FIG. 8 is a graph which shows the changes in the toe due to the vertical displacement of the wheel mounting member H. In this figure, the positive side of the vertical displacement is defined to be the rebounding side, the negative side thereof is defined to be the bumping side, the positive side of the toe is defined to be the toe-in side, and the negative side thereof is defined to be the toe-out side. In the figure, line "a" shows the reference change characteristics of the toe to be obtained by design data of the suspension, line b shows the change characteristics of the toe (also called toe change characteristics) measured when the clamping force is set to 62 kgf, and line c shows the change characteristics measured when the clamping force is set to 124 kgf. When the clamping force is set to 62 kgf, the toe change characteristics coincide with the reference change characteristics at a fairly high accuracy. However, when the clamping force is set to 124 kgf, the toe change characteristics considerably deviate from the reference change characteristics. When the clamping force is small, the alignment accuracy of the wheel mounting member H becomes poor. Therefore, the clamping force should be set between 50 kgf and 70 kgf.

The center of inclination of the wheel mounting member H and the center of inclination of the measuring element 9 do not coincide with each other. However, accompanied by the inclination of the wheel mounting member H, the measuring element 9 slides relative to the reference surface H*a* while being abutted at right angles with the reference surface H*a* of the wheel mounting member H. As a result of this sliding, the disagreement of the above-described centers of inclination is absorbed. Therefore, the measuring element 9 inclines at the same angle with the wheel mounting member H. The toe and the camber can thus be accurately measured by the toe detecting means 10*f* and the camber detecting means 10*g*, which detect the inclination angle of the measuring element 9. However, if the pushing force of the cylinder 10*j* to push the measuring element 9 becomes excessive, the ease with which the measuring element 9 slides along the reference surface H*a* of the wheel mounting member H is lost. If the pushing force to push the measuring element 9 becomes too small, on the other hand, the ability of the measuring element 9 to remain perpendicular to the reference surface H*a* is lost. Therefore, the pushing force of the measuring element 9 should be set within a range of 9.0 kgf to 10.0 kgf.

If the measuring element 9 interferes, as a result of its sliding movement, with those hub bolts H*b* for mounting the wheel which are embedded into the reference surface H*a*, the toe and the camber can no longer be accurately measured. Here, if the amount of misalignment of the wheel mounting member H relative to the measuring element 9 in the neutral position of the elevating frame 7 is below a predetermined allowable value, the measuring element 9 will not interfere with the hub bolts H*b* within the range of inclination in the toe direction and the camber direction of the wheel mounting member H as a consequence of the vertical movement of the wheel mounting member H by the up and down movement of the elevating frame 7. In this case, if the modulus of longitudinal elasticity of the elastic member which constitutes the elastic rollers $13_1$, $13_2$, $13_3$ becomes smaller than 1.5 kg/mm$^2$, the alignment accuracy of the wheel mounting member H becomes poor. As a result, there is a possibility that the amount of misalignment of the wheel mounting member H relative to the measuring element 9 in the neutral position of the elevating frame 7 exceeds the allowable value. Further, if the modulus of longitudinal elasticity of the elastic member becomes larger than 2.3 kg/mm$^2$, the freedom of inclination of the wheel mounting member H is lost. The amount of elastic deformation of the rubber bushes to be provided at the connecting portion of each of the arms of the suspension thus becomes larger than the one at the time of actual mounting on the vehicle, with the result that the alignment can no longer be accurately measured. Therefore, the elastic rollers $13_1$, $13_2$, $13_3$ should be formed by an elastic member whose modulus of longitudinal elasticity is within a range of 1.5 kg/mm$^2$ through 2.3 kg/mm$^2$.

The suspension is ordinarily constituted as follows. Namely, in a state in which the wheel mounting member H is in the vertically neutral position, if the connecting position of the control link D relative to the sub-frame G is adjusted by the alignment adjusting member Da so that the toe becomes zero, the camber also becomes zero. However, if the connecting position of the lower link C or the upper link E relative to the sub-frame G laterally deviates, the camber will not become zero even if the adjustment is made such that the toe becomes zero. Further, the toe change characteristics due to the vertical displacement of the wheel mounting member H deviate from the reference change characteristics. Still furthermore, also in case the connecting position of the trailing link B or the leading link F relative to the sub-frame G laterally deviates, the toe change characteristics due to the vertical displacement of the wheel mounting member H deviate from the reference change characteristics. This will be explained hereinbelow in more detail.

Figure 9A:
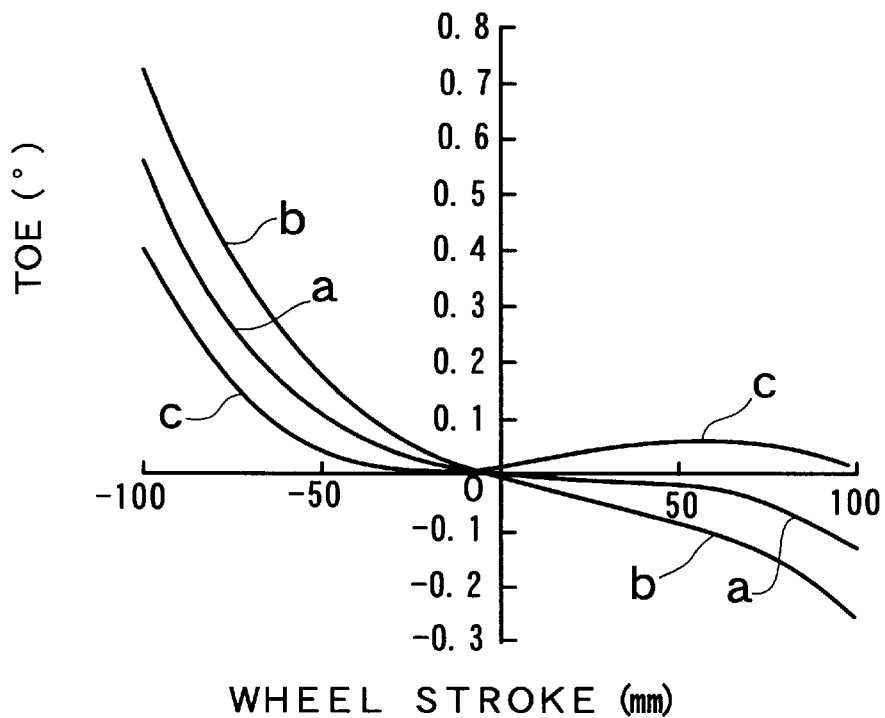
FIG. 9A is a graph showing the change in toe change characteristics due to deviation in the connecting position of a lower link and FIG. 9B is a graph showing the change in camber change characteristics due to deviation in the connecting position of the lower link.
Figure 9B:
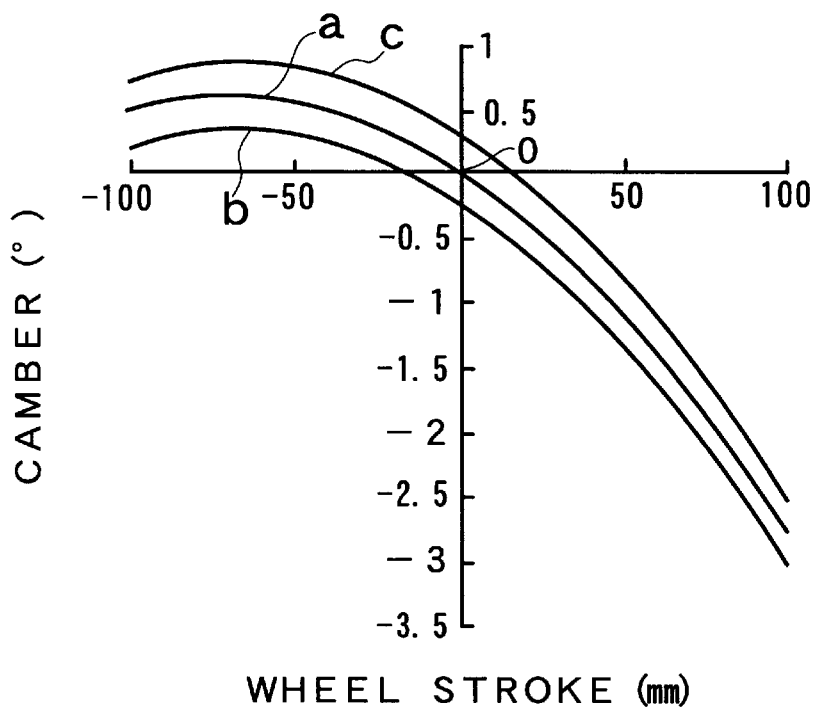
Figure 10:
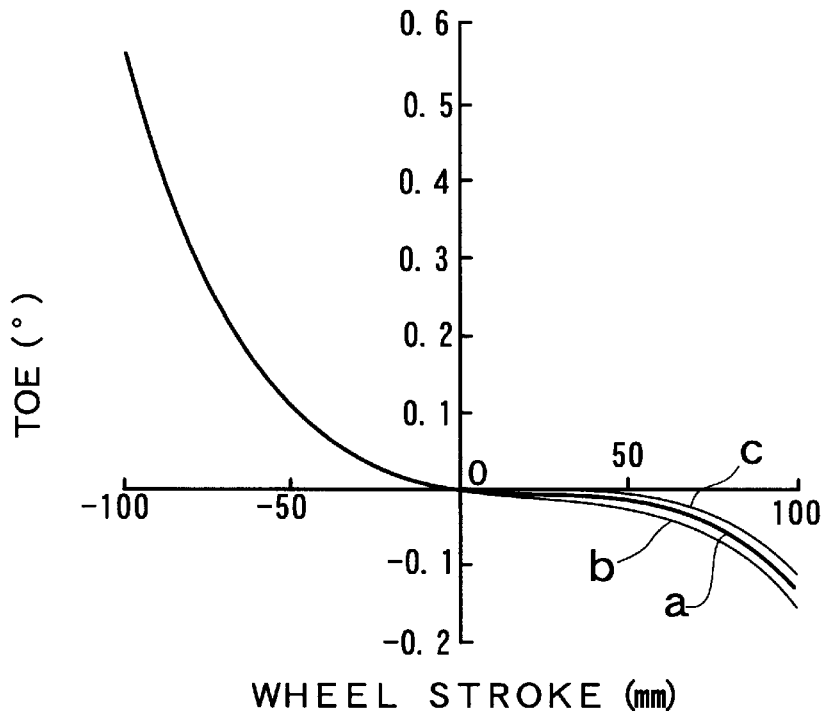
FIG. 10A is a graph showing the change in toe change characteristics due to deviation in the connecting position of an upper link and FIG. 10B is a graph showing the change in camber change characteristics due to deviation in the connecting position of the upper link.
Figure 10:
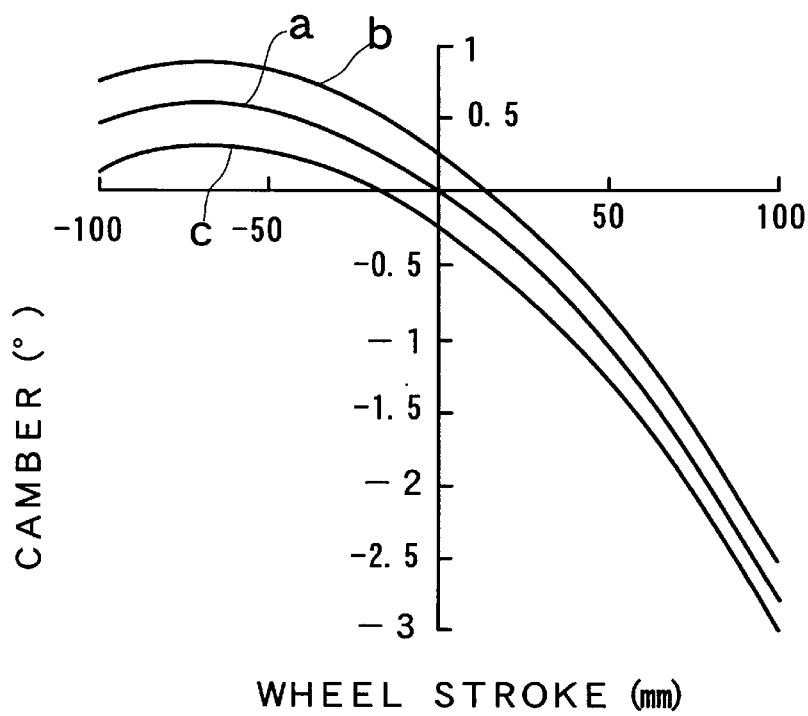
Figure 11A:
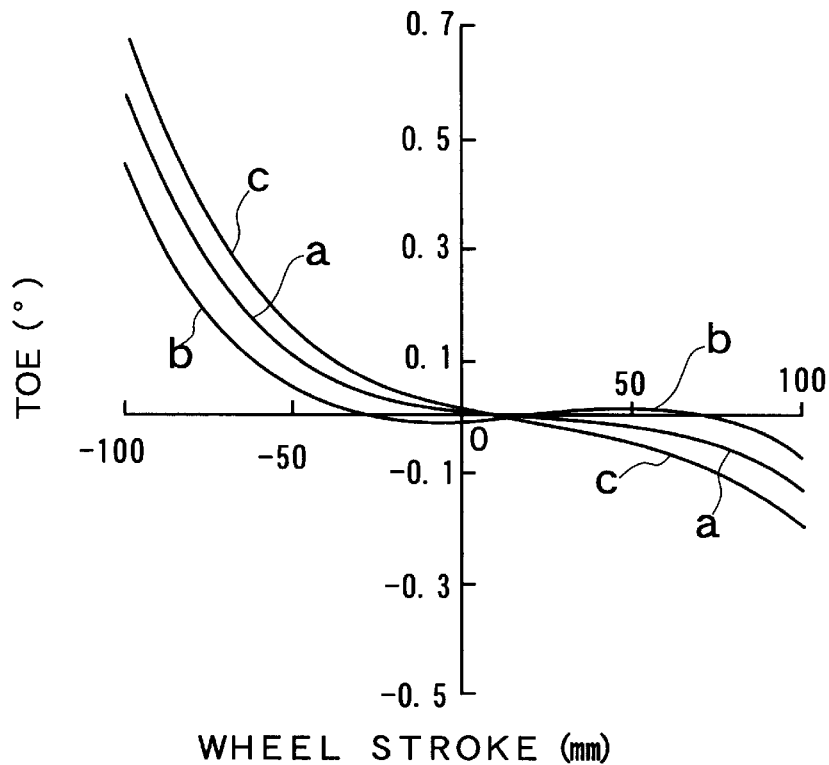
FIG. 11A is a graph showing the change in toe change characteristics due to deviation in the connecting position of a trailing link and FIG. 11B is a graph showing the change in camber change characteristics due to deviation in the connecting position of the trailing link.
Figure 11B:
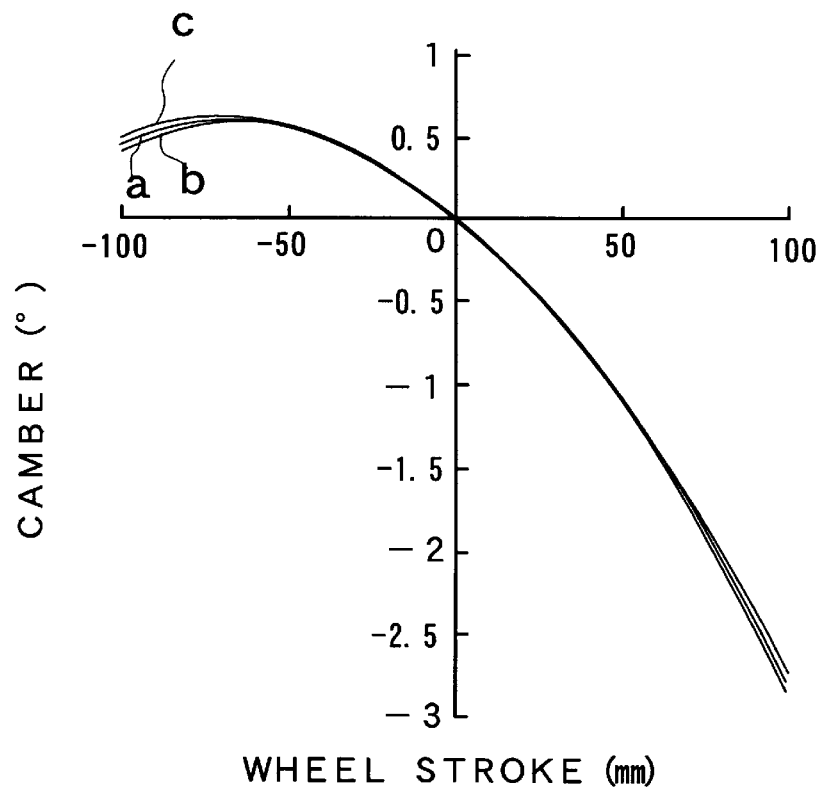
Figure 12A:
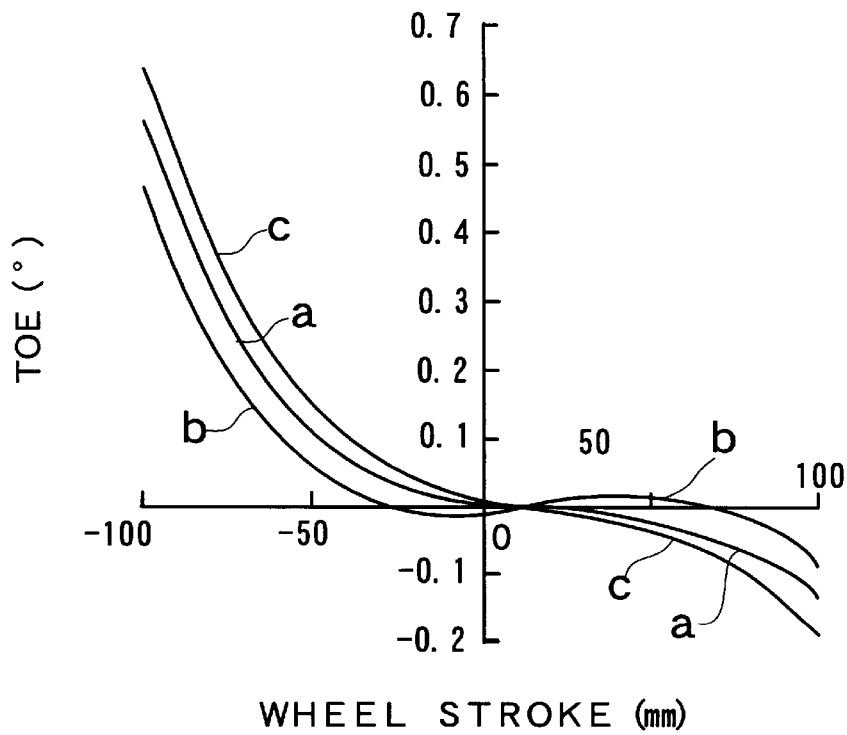
FIG. 12A a graph showing the change in toe change characteristics due to deviation in the connecting position of a leading link and FIG. 12B is a graph showing the change in camber change characteristics due to deviation in the connecting position of the leading link.
Figure 12B:
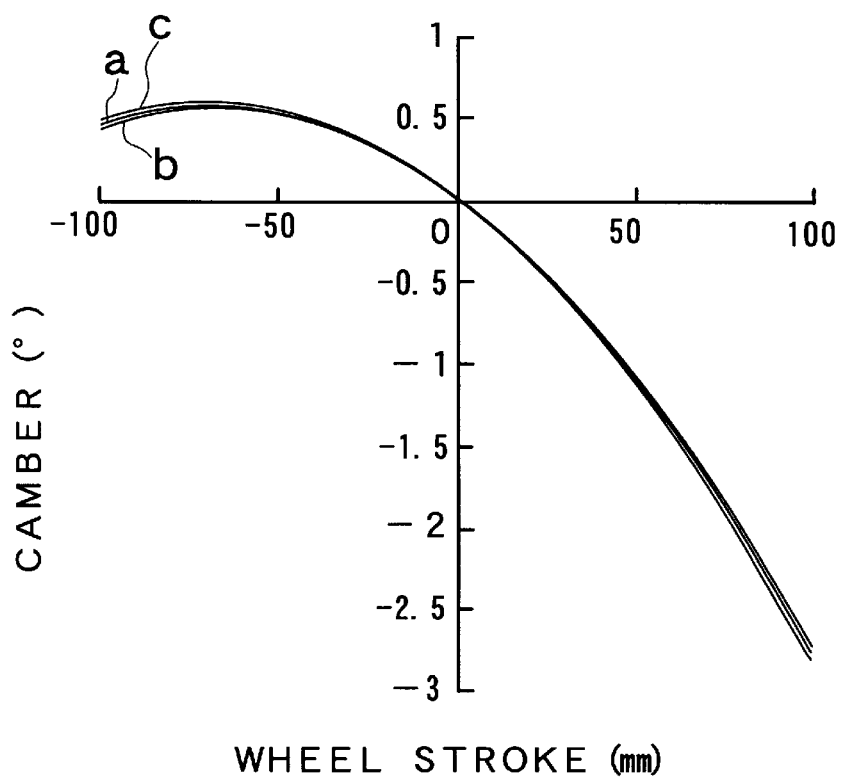

FIGS. 9A and 9B show deviations of change characteristics of the toe and the camber due to lateral deviation in the connecting position of the lower link C relative to the sub-frame G. FIGS. 10A and 10B show deviations of change characteristics of the toe and the camber due to lateral deviation in the connecting position of the upper link E relative to the sub-frame G. FIGS. 11A and 11B show deviations in change characteristics of the toe and the camber due to lateral deviation in the connecting position of the trailing link B relative to the sub-frame G. FIGS. 12A and 12B show deviations in change characteristics of the toe and the camber due to lateral deviation in the connecting position of the leading link F relative to the sub-frame G. In each of the figures, line "a" shows the reference change characteristics of the toe and the camber due to vertical deviations of the wheel mounting member H. Line b shows the change characteristics of the toe and the camber when the connecting position of each of the links C, E, B, F relative to the sub-frame G deviates laterally inward by 1 mm from the reference position. Line c shows the change characteristics of the toe and the camber when this connecting position deviates laterally outward by 1 mm. In FIGS. 9 through 12, the vertical displacement of the wheel mounting member H represented on the abscissa is defined to be positive on the side of rebounding. The toe represented on the ordinate in each of the figures with suffix "A" is defined to be positive on the side of toe-in. The camber represented on the ordinate in each of the figures with suffix "B" is defined to be positive on the side in which the upper side of the tire when mounted on the vehicle body inclines laterally outward.

If the connecting position of the lower link C or the upper link E deviates laterally, the change characteristics of the camber (also called camber change characteristics) deviate from the reference change characteristics as shown in FIGS. 9B and 10B. Even if the connecting position of the trailing link B or the leading link F deviates laterally, the camber change characteristics show little or no deviation from the reference change characteristics as shown in FIGS. 11B and 12B. Therefore, if there is a deviation in the camber change characteristics, it can be discriminated that the connecting position of one of the lower link C and the upper link E is laterally deviated. In addition, when a comparison is made between the case in which the connecting position of the lower link C is laterally deviated and the case in which the upper link E is laterally deviated, it can be seen from FIGS. 9A and 10A that the mode of deviation of the toe change characteristics from the reference change characteristics is different from each other. Based on this fact, a discrimination can be made as to which connecting position of the lower link C and the upper link E is laterally deviated.

Further, when the camber change characteristics show little or no deviation from the reference change characteristics while the toe change characteristics deviate from the reference change characteristics, a discrimination can be made that the connecting position of the trailing link B or the leading link F is laterally deviated.

As described hereinabove, by comparing the change characteristics of the toe and the camber with the reference change characteristics, the presence or absence of an assembly error can be discriminated. Further, the pattern of that deviation of change characteristics of the toe and the camber from the reference change characteristics which arises due to the deviation of the connecting position of each of the links is checked in advance. Then, the pattern of deviation of the actually measured change characteristics of the toe and the camber relative to the reference change characteristics is compared with the pattern that has been checked in advance. A discrimination can thus be made as to which particular connecting position of the links is deviated. Therefore, it is possible to correct the deviation in the connecting position by feeding back the above-described data to the process of manufacturing the sub-frames. The quality of the suspension can thus be improved. The comparison between the change characteristics of the toe and the camber and the reference change characteristics, as well as the comparison of deviation patterns can be automatically made by using a computer.

It is readily apparent that the above-described apparatus for measuring alignment of a suspension of a vehicle and a method of inspecting a suspension by using the above-described apparatus meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for measuring alignment of a suspension of a vehicle, said measuring being made at a stage of sub-assembling of the suspension, said apparatus comprising:

jig means for supporting a suspension sub-assembly in a predetermined position;

a supporting frame disposed on each lateral side of said jig means;

a measuring element which perpendicularly abuts with a reference surface which is at right angles to an axle of a wheel mounting member, said wheel mounting member being rotatably supported by a knuckle of the suspension;

holding means for holding said wheel mounting member in a condition to diametrically align said wheel mounting member;

a measuring head for supporting said measuring element so as to be inclinable about a longitudinal camber axis and about a vertical toe axis, said measuring head having camber detecting means and toe detecting means, said camber detecting means being for detecting an angle of inclination of said measuring element about said camber axis, said toe detecting means being for detecting an angle of inclination of said measuring element about said toe axis;

said measuring head being supported on said supporting frame in a manner to be pushed laterally inward via pushing means such that said measuring element abuts with said reference surface of said wheel mounting member;

wherein a plurality of holding arms which constitute said holding means are supported on said supporting frame so as to be opened and closed in a diametrical direction of said wheel mounting member; and wherein an elastic roller which is made up of an elastic member to abut with a circumferential surface of said wheel mounting member is supported on each of said holding arms, said roller being rotatable about a roller axis which is parallel with a tangential line of said wheel mounting member at a point of abutment with each of said rollers.

2. An apparatus according to claim 1, wherein each of said elastic rollers is supported on each of said holding arms so as to be slidable in an axial direction of said roller axis.

3. An apparatus according to claim 1, wherein a pair of upper and lower holding arms are provided as said holding arm, wherein two elastic rollers are rotatably supported on one of said holding arms so as to abut with the circumferential surface of said wheel mounting member on both circumferential sides of a vertical diametrical line of said wheel mounting member, and wherein one elastic roller is rotatably supported on the other of said holding arms so as to abut with the circumferential surface of said wheel mounting member at said diametrical line.

4. An apparatus according to claim 2, wherein a pair of upper and lower holding arms are provided as said holding arm, wherein two elastic rollers are rotatably supported on one of said holding arms so as to abut with the circumferential surface of said wheel mounting member on both circumferential sides of a vertical diametrical line of said wheel mounting member, and wherein one elastic roller is rotatably supported on the other of said holding arms so as to abut with the circumferential surface of said wheel mounting member at said diametrical line.

5. An apparatus according to claim 3, further comprising: a first rack which is connected to said upper holding arm so as to extend downward; a second rack which is connected to said lower holding arm so as to extend upward; and a pinion which is engaged with said first and second racks and is rotatably supported by said supporting frame, whereby a synchronous mechanism is constituted by said racks and said pinion.

6. An apparatus according to claim 4, further comprising: a first rack which is connected to said upper holding arm so as to extend downward; a second rack which is connected to said lower holding arm so as to extend upward; and a pinion which is engaged with said first and second racks and is rotatably supported by said supporting frame, whereby a synchronous mechanism is constituted by said racks and said pinion.

7. An apparatus according to any one of claims 1 through 6, wherein said supporting frame is vertically driven, and said apparatus further comprises displacement detecting means for detecting a vertical displacement of said supporting frame.

8. An apparatus according to any one of claims 1 through 6, further comprising means for pushing said supporting frame in a back and forth direction.

9. An apparatus for measuring alignment according to claim 7, further comprising means for pushing said supporting frame in a back and forth direction.

10. A method of inspecting a suspension by using an apparatus for measuring alignment of a suspension of a vehicle, said apparatus comprising:

jig means for supporting a suspension sub-assembly in a predetermined position;

a supporting frame disposed on each lateral side of said jig means;

a measuring element which perpendicularly abuts with a reference surface which is at right angles to an axle of a wheel mounting member, said wheel mounting member being rotatably supported by a knuckle of the suspension;

holding means for holding said wheel mounting member in a condition to diametrically align said wheel mounting member;

a measuring head for supporting said measuring element so as to be inclinable about a longitudinal camber axis and about a vertical toe axis, said measuring head having camber detecting means and toe detecting means, said camber detecting means being for detecting an angle of inclination of said measuring element about said camber axis, said toe detecting means being for detecting an angle of inclination of said measuring element about said toe axis;

said measuring head being supported on said supporting frame in a manner to be pushed laterally inward via pushing means such that said measuring element abuts with said reference surface of said wheel mounting member:

wherein a plurality of holding arms which constitute said holding means are supported on said supporting frame so as to be opened and closed in a diametrical direction of said wheel mounting member; and wherein an elastic roller which is made up of an elastic member to abut with a circumferential surface of said wheel mounting member is supported on each of said holding arms, said roller being rotatable about a roller axis which is parallel with a tangential line of said wheel mounting member at a point of abutment with each of said rollers, wherein said supporting frame is vertically driven, said apparatus further comprising displacement detecting means for detecting a vertical displacement of said supporting frame, said method comprising:

adjusting alignment such that a toe and a camber of said wheel mounting member become predetermined values respectively;

vertically moving the suspension by vertically driving said supporting frame;

obtaining toe change characteristics and camber change characteristics of said wheel mounting member due to vertical movement of the suspension, based on changes in a detected value of said displacement detecting means, in a detected value of said toe detecting means, and in a detected value of said camber detecting means during the vertical movement; and comparing the toe change characteristics and the camber change characteristics with reference change characteristics to thereby judge an assembly accuracy of the suspension.

11. A method according to claim 10, further comprising:

checking in advance as to in what pattern the toe change characteristics and the camber change characteristics deviate relative to the reference change characteristics when a connecting position of each of a plurality of constituting members of the suspension deviates relative to a sub-frame; and discriminating a cause for an assembly error in the suspension by comparing the pattern of deviation of measured toe change characteristics and measured camber change characteristics relative to the reference change characteristics with the pattern which is checked in advance.

* * * * *